United States Patent
Okada (10) Patent No.: US 10,203,672 B2
(45) Date of Patent: Feb. 12, 2019

(54) PORTABLE ELECTRONIC DEVICE EQUIPPED WITH SENSOR UNIT, SENSOR CONTROL SYSTEM, AND SENSOR CONTROL METHOD

(71) Applicant: CASIO COMPUTER CO., LTD., Shibuya-ku, Tokyo (JP)

(72) Inventor: Kayo Okada, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 263 days.

(21) Appl. No.: 15/077,714

(22) Filed: Mar. 22, 2016

(65) Prior Publication Data
US 2016/0378083 A1 Dec. 29, 2016

(30) Foreign Application Priority Data
Jun. 29, 2015 (JP) ................. 2015-129835

(51) Int. Cl.
G05B 15/02 (2006.01)
G05B 6/02 (2006.01)
G01S 19/24 (2010.01)

(52) U.S. Cl.
CPC .............. G05B 15/02 (2013.01); G01S 19/24 (2013.01); G05B 6/02 (2013.01); G06F 1/3206 (2013.01)

(58) Field of Classification Search
CPC ........... G01S 19/24; G05B 15/02; G05B 6/02; G06F 1/3206
See application file for complete search history.

(56) References Cited

U.S. PATENT DOCUMENTS

| | | | |
|---|---|---|---|
| 9,409,052 B2 | 8/2016 | Werner | |
| 2010/0088023 A1 | 4/2010 | Werner | |
| 2011/0128824 A1* | 6/2011 | Downey | A63B 24/0021 368/14 |
| 2012/0203491 A1* | 8/2012 | Sun | G06F 19/3406 702/108 |
| 2016/0007925 A1* | 1/2016 | Mirov | A61B 5/0059 356/400 |

(Continued)

FOREIGN PATENT DOCUMENTS

| | | |
|---|---|---|
| CN | 101681494 A | 3/2010 |
| JP | 2010088886 A | 4/2010 |
| JP | 2013009231 A | 1/2013 |

(Continued)

OTHER PUBLICATIONS

Japanese Office Action (and English translation thereof) dated Mar. 21, 2017 issued in counterpart Japanese Application No. 2015-129835.

(Continued)

*Primary Examiner* — Yuhui R Pan
(74) *Attorney, Agent, or Firm* — Holtz, Holtz & Volek PC (57) ABSTRACT

A portable electronic device includes: a sensor unit configured to measure a condition of a user and/or an environment where the user is located; an action pattern storage unit configured to store therein an action pattern; and a control unit configured to control the sensor unit, wherein the control unit controls, with reference to the action pattern storage unit, an operation state of the sensor unit such that the operation state is adapted to an action state of the user.

8 Claims, 9 Drawing Sheets

| | GPS RECORDING *4 | ACCELERATION | GYRO | HEART RATE METER | ALTIMETER | ... |
|---|---|---|---|---|---|---|
| WALKING | EVERY MINUTE | *5 | × | EVERY 10 MINUTES | × | |
| RUNNING | EVERY SECOND | *5 | × | EVERY MINUTE | EVERY MINUTE | |
| HIKING | EVERY MINUTE | *5 | × | EVERY 10 MINUTES | × | |
| TRAIL RUNNING | EVERY MINUTE | *5 | × | EVERY MINUTE | EVERY MINUTE | |
| CYCLING (ROAD BIKE) | EVERY SECOND | *5 | × | EVERY 10 MINUTES | EVERY MINUTE | |
| CYCLING (MTB) | EVERY SECOND | *5 | × | EVERY MINUTE | EVERY SECOND | |
| FISHING | EVERY 10 MINUTES | *5 | ANY TIME WHEN TRIGGERED BY OPERATION OF ACCELERATION (SPECIFIC ARM MOVEMENT) | ANY TIME WHEN TRIGGERED BY OPERATION OF ACCELERATION (SPECIFIC ARM MOVEMENT) | × | |
| WATER SPORT | EVERY SECOND | *5 | × | EVERY 10 MINUTES | × | |
| REST | EVERY 5 MINUTES | *5 | × | EVERY 10 MINUTES | × | |
| MOVEMENT WITH VEHICLE | EVERY MINUTE | *5 | × | × | × | |
| ... | | | | | | |

123

(56) References Cited

U.S. PATENT DOCUMENTS

2017/0010658 A1* 1/2017 Tanaka .................... G06F 1/163

FOREIGN PATENT DOCUMENTS

JP          2014511189 A      5/2014
JP          2014212915 A     11/2014

OTHER PUBLICATIONS

Ouchi, et al., "Living Activity Recognition Technology Using Sensors in Smartphone", Toshiba Review, Jun. 2013, vol. 68, No. 6, pp. 40 to 43.
Chinese Office Action (and English language translation thereof) dated Aug. 30, 2018 issued in counterpart Chinese Application No. 201610173419.6.

* cited by examiner

| WALK |
|---|
| STATIONARY |
| SPECIFIC ARM MOVEMENT |
| RUN |
| RIDING BICYCLE |
| RIDING IN CAR |
| RIDING IN TRAIN |
| RIDING IN ANOTHER VEHICLE |
| ... |

FIG. 2B 121b

| ON ROAD |
|---|
| MOUNTAIN |
| LAKE |
| SEA |
| ALTITUDE INCREASES/DECREASES BY N m/h OR MORE |
| ... |

| | ON ROAD | MOUNTAIN | LAKE | SEA | ALTITUDE INCREASES/ DECREASES BY N m/h OR MORE | ... |
|---|---|---|---|---|---|---|
| WALK | WALKING | HIKING | × | × | HIKING | |
| STATIONARY | REST | REST | REST | REST | REST | |
| SPECIFIC ARM MOVEMENT *1 | × | FISHING | FISHING | FISHING | × | |
| RUN | RUNNING | TRAIL RUNNING | × | × | TRAIL RUNNING | |
| RIDING BICYCLE | CYCLING (ROAD) | CYCLING (MTB) | × | × | CYCLING (MTB) | |
| RIDING IN CAR | MOVEMENT WITH VEHICLE | MOVEMENT WITH VEHICLE | MOVEMENT WITH VEHICLE | MOVEMENT WITH VEHICLE | MOVEMENT WITH VEHICLE | |
| RIDING IN TRAIN | MOVEMENT WITH VEHICLE | MOVEMENT WITH VEHICLE | WATER SPORT | WATER SPORT | MOVEMENT WITH VEHICLE | |
| RIDING IN ANOTHER VEHICLE | | CABLE CAR OR LIFT | | | | |
| ... | | | | | | |

FIG. 3B

| BEFORE/AFTER | RUNNING | HIKING | TRAIL RUNNING | FISHING | REST | ... |
|---|---|---|---|---|---|---|
| RUNNING | — | | *2 | *3 | | |
| HIKING | | — | | | | |
| TRAIL RUNNING | *3 | | — | *3 | | |
| FISHING | | | *3 | — | — | |
| REST | | | | | — | |
| ... | | | | | | |

| | GPS RECORDING *4 | ACCELERATION | GYRO | HEART RATE METER | ALTIMETER | ... |
|---|---|---|---|---|---|---|
| WALKING | EVERY MINUTE | *5 | × | EVERY 10 MINUTES | × | |
| RUNNING | EVERY SECOND | *5 | × | EVERY MINUTE | EVERY MINUTE | |
| HIKING | EVERY MINUTE | *5 | × | EVERY 10 MINUTES | × | |
| TRAIL RUNNING | EVERY MINUTE | *5 | × | EVERY MINUTE | EVERY MINUTE | |
| CYCLING (ROAD BIKE) | EVERY SECOND | *5 | × | EVERY 10 MINUTES | EVERY MINUTE | |
| CYCLING (MTB) | EVERY SECOND | *5 | × | EVERY MINUTE | EVERY SECOND | |
| FISHING | EVERY 10 MINUTES | | ANY TIME WHEN TRIGGERED BY OPERATION OF ACCELERATION (SPECIFIC ARM MOVEMENT) | ANY TIME WHEN TRIGGERED BY OPERATION OF ACCELERATION (SPECIFIC ARM MOVEMENT) | × | |
| WATER SPORT | EVERY SECOND | *5 | × | EVERY 10 MINUTES | × | |
| REST | EVERY 5 MINUTES | *5 | × | EVERY 10 MINUTES | × | |
| MOVEMENT WITH VEHICLE | EVERY MINUTE | *5 | × | × | × | |
| ... | | | | | | |

PORTABLE ELECTRONIC DEVICE EQUIPPED WITH SENSOR UNIT, SENSOR CONTROL SYSTEM, AND SENSOR CONTROL METHOD

CROSS-REFERENCE TO RELATED APPLICATION

This application is based upon and claims the benefit of priority under 35 USC 119 of Japanese Patent Application No. 2015-129835 filed on Jun. 29, 2015 the entire disclosure of which, including the description, claims, drawings, and abstract, is incorporated herein by reference in its entirety.

BACKGROUND OF THE INVENTION

1. Field of the Invention

The present invention relates to a technique for appropriately controlling operation of a sensor.

2. Description of the Related Art

Since a wearable terminal is always worn by a user near his/her body, the wearable terminal is highly valuable when used as a device that continuously measures biological information and environmental information. Recently, a product on which a plurality of sensors (acceleration, gyro, heart rate, global positioning system (GPS) sensor or the like) is mounted has already been commercially available. It is assumed that the number and types of sensors mounted on a single wearable terminal will continue to increase in the future.

For example, JP-2013-009231-A describes a technique that includes: a measurement sensor unit that measures a physical amount of a measurement object; a communication unit that wirelessly communicates data of the physical amount measured by the measurement sensor unit; and an activation sensor unit that has a lower current consumption than the measurement sensor unit and activates a control unit when a physical amount of a surrounding environment exceeds a threshold value. Specifically, the control unit controls a timing for activating each of the measurement sensor unit and the communication unit after being activated by the activation sensor unit, on the basis of a result of comparing a first power consumption of the measurement sensor unit and a second power consumption of the communication unit with suppliable power of a battery, and also on the basis of operation time required for the measurement sensor unit to measure the physical amount.

SUMMARY OF THE INVENTION

According to an embodiment of the present invention, there is provided an electronic device including: a sensor unit configured to measure a condition of a user and/or an environment where the user is located; an action pattern storage unit configured to store therein an action pattern; and a control unit configured to control the sensor unit, wherein the control unit controls, with reference to the action pattern storage unit, an operation state of the sensor unit such that the operation state is adapted to an action state of the user.

According to another embodiment of the present invention, there is provided a sensor control system including: an electronic device; and a server coupled to the electronic device via a network, wherein the electronic device includes: a sensor unit configured to measure a condition of a user and/or an environment where the user is located; and a control unit configured to control the sensor unit, the server includes an action pattern storage unit configured to store therein an action pattern, and the control unit controls, with reference to the action pattern, an operation state of the sensor unit such that the operation state is adapted to an action state of the user.

According to another embodiment of the present invention, there is provided a sensor control method including the steps of, by a computer of an electronic device: measuring a condition of a user and/or an environment where the user is located using a sensor unit; storing an action pattern; and controlling, in accordance with the action pattern, an operation state of the sensor unit such that the operation state is adapted to an action state of the user.

The present invention has been made for solving the above-mentioned problem, and an object thereof is to provide a portable electronic device, a sensor control system, a sensor control method, and a sensor control program capable of appropriately controlling operation of a sensor in accordance with various types of users or a variety of user actions.

According to an embodiment of the present invention, operation of a sensor can be appropriately controlled in accordance with various types of users or a variety of user actions.

DETAILED DESCRIPTION OF THE PREFERRED EMBODIMENTS

Hereinafter, embodiments for practicing the present invention (hereinafter referred to as embodiments) will be described in detail with reference to the accompanying drawings. In the subsequent drawings, identical elements are provided with the same numbers or reference signs throughout the entire description of the embodiments.

Configuration of First Embodiment

Figure 1:
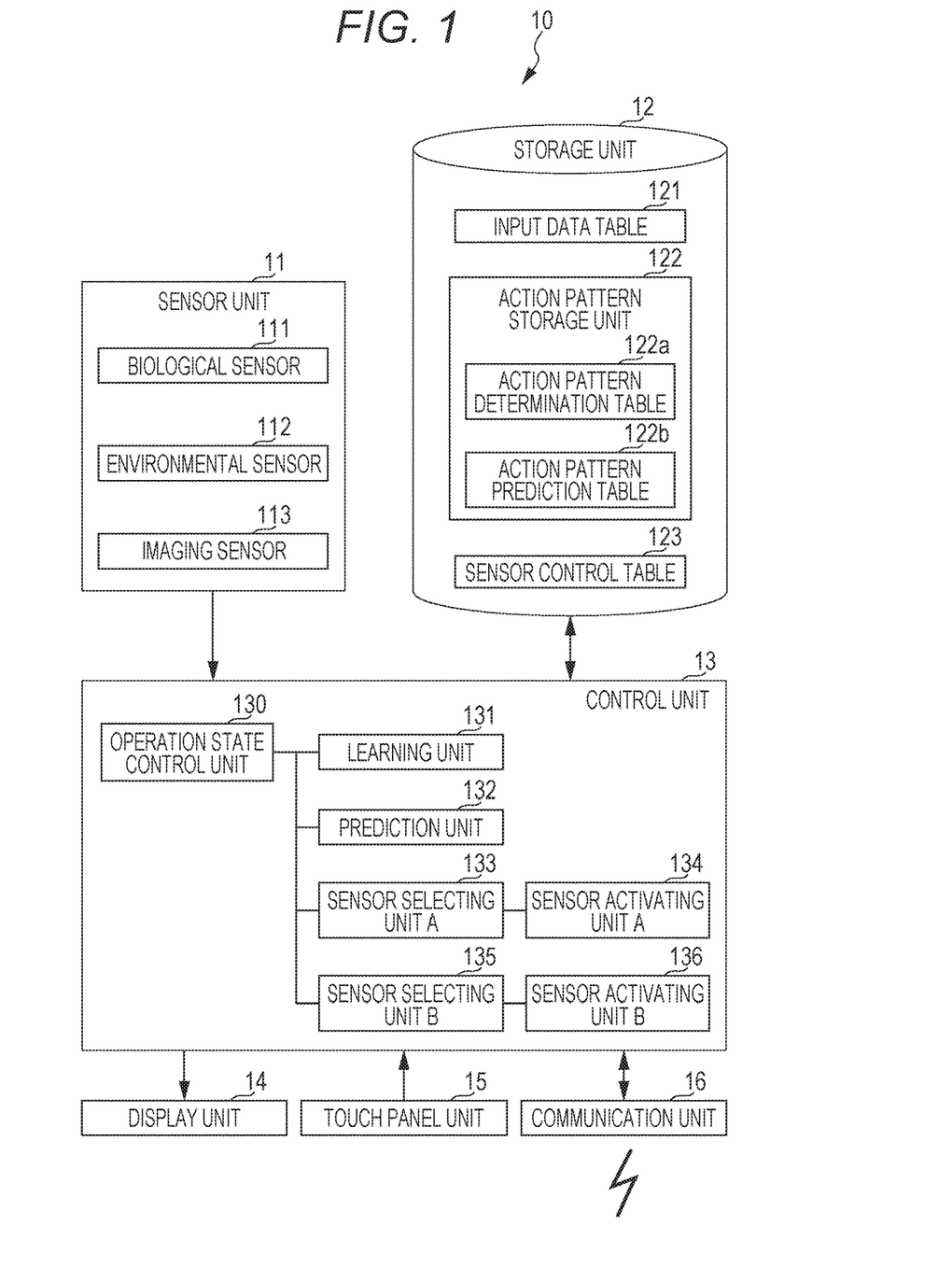
FIG. 1 is a block diagram illustrating a configuration of a portable electronic device according to a first embodiment of the present invention.

FIG. 1 is a block diagram illustrating a configuration of a portable electronic device according to a first embodiment of the present invention. The portable electronic device 10 according to the first embodiment is assumed to be a wearable electronic device that can be wound around an arm of a user while the user is running or jogging. The portable electronic device 10 therefore includes a sensor unit 11, a storage unit 12, a control unit 13, a display unit 14, a touch panel unit 15, and a communication unit 16.

The sensor unit 11 includes a biological sensor 111 and an environmental sensor 112 including a GPS receiver or the like.

The biological sensor 111 includes a plurality of sensors (first plurality of sensors) that measures biological information such as a physical condition of the user (e.g., pulse (heart rate), blood pressure, and body temperature). The biological information measured by the biological sensor 111 is stored in a work area of the storage unit 12. The environmental sensor 112 includes a plurality of sensors (second plurality of sensors) that measures environmental information such as an environment where the user is located (e.g., temperature, atmospheric pressure, humidity, ultraviolet dose, and noise). The environmental information measured by the environmental sensor 112 is stored in the work area of the storage unit 12.

The environmental sensor 112 includes, in addition to the GPS receiver, a triaxial geomagnetic sensor, a uniaxial acceleration sensor, and a uniaxial gyro or the like. The GPS receiver receives, through an antenna, radio waves transmitted from a plurality of positioning satellites (GPS satellites) to obtain position data including latitude and longitude indicating a current position. The GPS receiver then supplies, to the control unit 13, the obtained position data as position information indicating a place where the user performs an action. The GPS receiver measures a so-called absolute position. By using the triaxial geomagnetic sensor, the uniaxial acceleration sensor, and the uniaxial gyro in addition to the GPS receiver, it is even possible to measure movement of the device in a triaxial direction. A combination of these sensors enables a moving track or a motion log of the user to be accurately traced. The position information measured by the GPS receiver or the like of the environmental sensor 112 is stored in the work area of the storage unit 12 in the same way as the biological information and the environmental information.

The sensor unit 11 may further include an imaging sensor 113 such as a CMOS and a CCD. The user can photograph and record, for example, a face of the user or a surrounding view to use them as an action history. An image recognition technique makes it possible to analyze a facial expression of the user to understand his/her feelings or fatigue degree. Such an image recognition technique can therefore be used as an alternative to the biological sensor 111.

A static random access memory (SRAM), a dynamic random access memory (DRAM) or the like backed up by a battery is implemented in the storage unit 12. Not only a program area that stores therein a sensor control program according to an embodiment of the present invention but also the work area that stores therein various data generated in a program execution process is assigned to the storage unit 12. Specifically, the data stored in the work area include an input data table 121, an action pattern storage unit 122, and a sensor control table 123. The input data table 121 stores therein a motion state of the user which is estimated from the biological information, the environmental information, and the position information or the like measured by the sensor unit 11. The action pattern storage unit 122 preliminarily stores therein a typical action pattern or stores therein an action history of the user by learning a result measured by the sensor unit 11. The sensor control table 123 stores therein control data for a sensor that is selected and activated to be adapted to the action pattern of the user. Data structures of the input data table 121, the action pattern storage unit 122 (action pattern determination table 122*a* and action pattern prediction table 122*b*), and the sensor control table 123 will be described later.

The control unit 13 controls the sensor unit 11 coupled thereto according to the sensor control program stored in the program area of the storage unit 12. In addition, the control unit 13 also controls the display unit 14, the touch panel unit 15, and the communication unit 16, each coupled to the control unit 13 as a peripheral device. The control unit 13 also controls, according to the sensor control program and with reference to the action pattern storage unit 122, an operation state of the sensor unit 11 such that the operation state is adapted to an action state of the user. In this regard, the action state includes an action state (first action state) currently in progress and an action state (second action state) predicted to be subsequent to the action state currently in progress. The control unit 13 therefore controls, with reference to the action pattern storage unit 122, the operation state of the sensor unit 11 such that the operation state is adapted to a current action of the user. The control unit 13 also predicts a subsequent next action of the user with reference to the action pattern storage unit 122 and controls the operation state of the sensor unit 11 such that the operation state is adapted to the predicted next action of the user.

In order to realize the above-mentioned function, the control unit 13 includes, as represented by blocks developed from a structure of the sensor control program to be executed, an operation state control unit 130, a learning unit 131, a prediction unit 132, a sensor selecting unit A (first sensor selecting unit) 133, a sensor activating unit A (first sensor activating unit) 134, a sensor selecting unit B (second sensor selecting unit) 135, and a sensor activating unit B (second sensor activating unit) 136.

The operation state control unit 130 has a function to manage operations of the learning unit 131, the prediction unit 132, the sensor selecting unit A 133, the sensor activating unit A 134, the sensor selecting unit B 135, and the sensor activating unit B 136. The operation state control unit 130 also has a function to control, with reference to the action pattern storage unit 122, the operation states of the various sensors 111, 112, 113 included in the sensor unit 11 such that the operation states are adapted to the action state of the user.

The learning unit 131 functions in cooperation with the operation state control unit 130. Accordingly, the learning unit 131 performs control so as to learn using the result measured by the sensor unit 11, cause the learning result to be reflected in the typical action pattern preliminarily stored in the action pattern storage unit 122, and store such an action pattern as the action history of the user. In other words, the action history is sequentially updated in accordance with the action of the user, and the action state is predicted based on the learning with reference to the updated action history. The prediction unit 132 functions in cooperation with the operation state control unit 130. Accordingly, the prediction unit 132 predicts, with reference to the action pattern storage unit 122, the next action of the user when the operation state of the sensor unit 11 is controlled to be adapted to the current action of the user. The prediction unit 132 then controls the operation state of the sensor unit 11 such that the operation state is adapted to the predicted next action of the user.

The sensor selecting unit A 133 selects, under the control of the operation state control unit 130 and according to the sensor control table 123 stored in the storage unit 12, at least one sensor to be adapted to the action state from among a plurality of the biological sensors 111 that measures the physical condition of the user. The sensor selecting unit A 133 then controls the sensor activating unit A 134. The sensor activating unit A 134 sets the sensor selected by the sensor selecting unit A 133 to a standby state. The sensor selecting unit A 133 can change a sensing timing and/or detection output by appropriately updating the contents of the sensor control table 123 stored in the storage unit 12.

The sensor selecting unit B 135 selects, under the control of the operation state control unit 130 and according to the sensor control table 123 stored in the storage unit 12, at least one sensor to be adapted to the action state from among a plurality of the environmental sensors 112 that measures the environment where the user is located. The sensor selecting unit B 135 then controls the sensor activating unit B 136. The sensor activating unit B 136 sets the sensor selected by the sensor selecting unit B 135 to a standby state. The sensor selecting unit B 135 can change a sensing timing and/or detection output by appropriately updating the contents of the sensor control table 123 stored in the storage unit 12.

The display unit 14 is a display monitor including, for example, a liquid crystal device (LCD) and a drive circuit that drives the LCD. The touch panel unit 15 is provided on the display unit 14, and operation is performed by touching a screen of the display unit 14. The communication unit 16 is a wireless communication interface or a wired communication interface that establishes, for example, a link such as Bluetooth (registered trademark) with an external device (not illustrated) such as a smartphone terminal and a server.

Figure 2A:
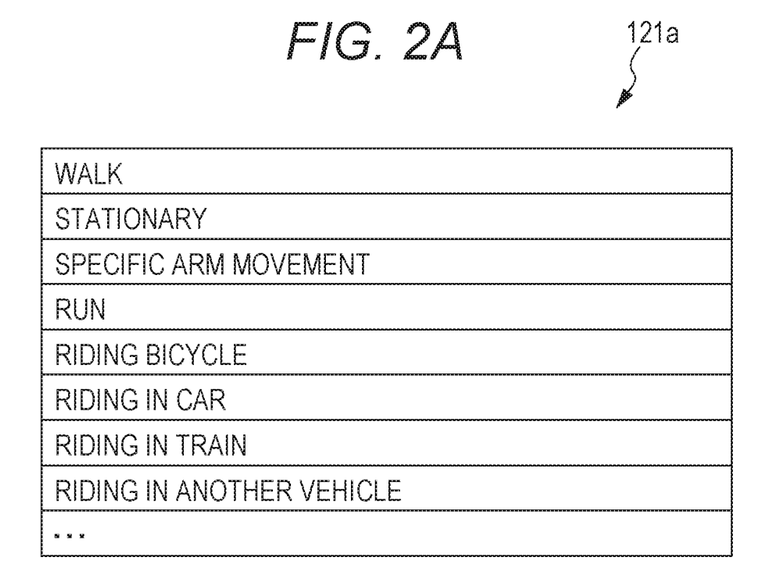
FIG. 2A is a diagram illustrating an exemplary data structure of an input data table of FIG. 1 indicating a motion state.
Figure 2B:
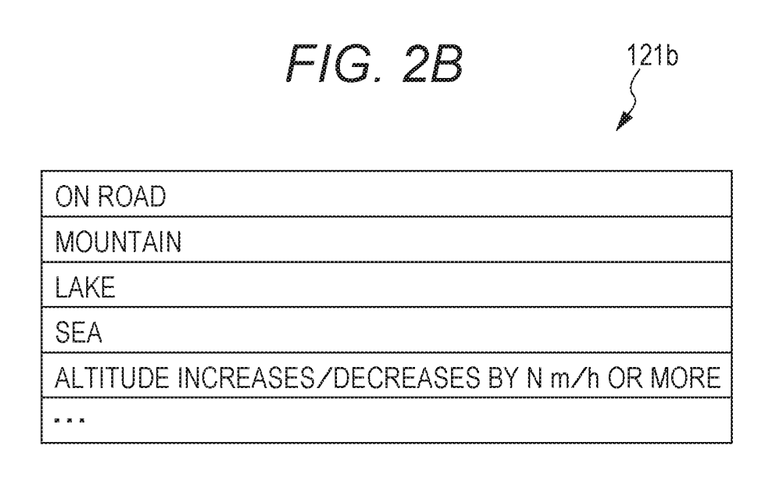
FIG. 2B is a diagram illustrating an exemplary data structure of an input data table of FIG. 1 indicating an external environment.

An exemplary data structure of the input data table 121*a* and an exemplary data structure of the input data table 121*b* are illustrated in FIGS. 2A and 2B, respectively. The motion state of the user determined based on, for example, the biological information obtained by the biological sensor 111 and the motion log obtained by the environmental sensor 112 is set in the input data table 121*a*. The input data table 121*b* is set based on, for example, the external environment obtained by the environmental sensor 112.

According to the input data table 121*a* of FIG. 2A, the motion state of the user such as "walk" or "stationary" can be obtained from, for example, the biological information such as the heart rate and the pulse obtained by the biological sensor 111, and a movement log such as, for example, a movement of a specific arm can be obtained by the environmental sensor 112. Such information is set in the input data table 121*a* of the storage unit 12 under the control of the control unit 13 (operation state control unit 130). By keeping the environmental information obtained by the environmental sensor 112 or a GPS track and map data, an altitude or other geographic attributes related to specific position information can be found out. For example, it can be determined that the user is currently on a road, or in a mountain, a lake, a sea or the like. It can further be determined that, for example, the user is in an altitude of n m or higher on a road/in a building/near Mount X/on Lake Y. Such information is set in the input data table 121*b* of the storage unit 12 under the control of the control unit 13 (operation state control unit 130).

Data about the altitude are provided by Geospatial Information Authority of Japan. Details of the data about the altitude are disclosed in <Internet URL> "http://www.g-si.go.jp/johofukyu/hyoko_system.html". Open source map data such as "Open Street Map" can be an alternative to the data provided by Geospatial Information Authority of Japan. The map data enable a building, a road, or a natural object to be tagged in detail with respect to a place or an area. By using the map data, geographic attributes of a certain place can be found out. This feature is disclosed in <Internet URL> "http://wiki.openstreetmap.org/wiki/JA:Map_Features".

Figure 3A:
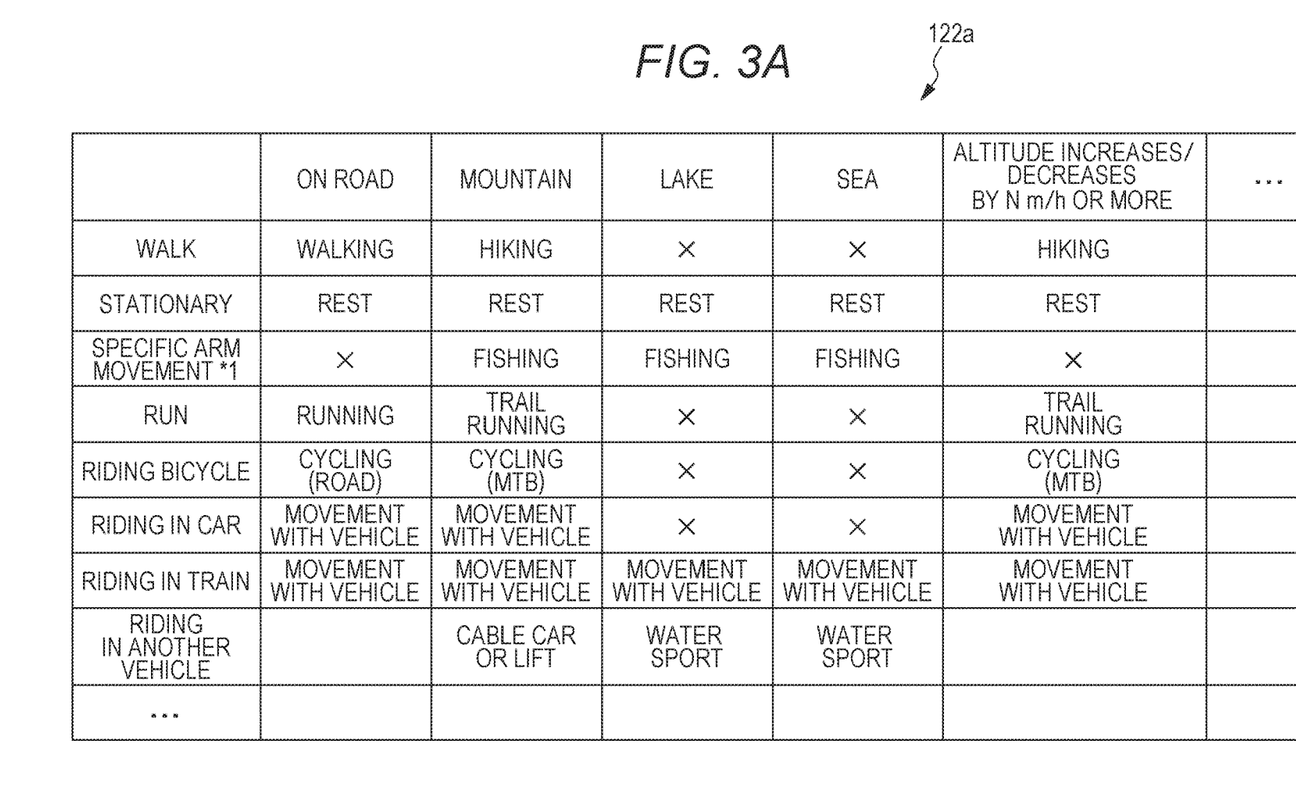
FIG. 3A is a diagram illustrating an exemplary data structure of an action pattern determination table in an action pattern storage unit of FIG. 1.
Figure 3B:
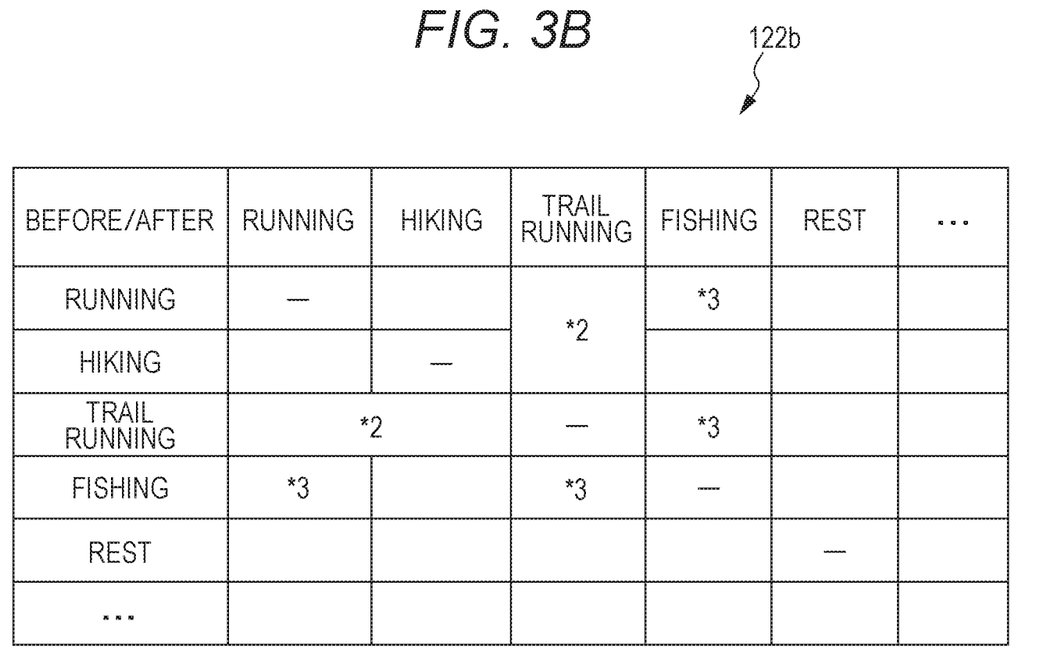
FIG. 3B is a diagram illustrating an exemplary data structure of an action pattern prediction table in the action pattern storage unit of FIG. 1.

An exemplary data structure of the action pattern determination table 122*a* stored in the action pattern storage unit 122 and an exemplary data structure of the action pattern prediction table 122*b* stored in the same action pattern storage unit 122 are illustrated in FIGS. 3A and 3B, respectively. The action pattern determination table 122*a* is a table that is used to determine the current action state of the user according to the motion state and the external environment stored in the input data table. The action pattern prediction table 122*b* is a table that is used to predict the next action of the user subsequent to the determined action state and to determine the predicted next action state of the user. Both of the action states are determined or predicted according to a matrix of the motion state (input data table 121*a*) and the external environment (input data table 121*b*) set in the input data table 121.

For the determination of the action state, known examples include "Detected Activity API" of Android distributed through smartphones or the like and "AutomaticActivity Recognition" that is one of Web APIs and provided by Invensense, Inc.

According to the action pattern determination table 122*a* of FIG. 3A, in a case where the motion state of the input data table 121*a* is "walk" and the external environment of the input data table 121*b* is "on road", the action state of the user can be determined to be "walking" according to the matrix. In a case where the motion state is "walk" and the external environment is "mountain" or "altitude increases/decreases by n m/h or more", the action state of the user is determined to be "hiking" according to the matrix. The determination is performed by the operation state control unit 130 of the control unit 13. In a case where the motion state of the input data table 121*a* is "stationary", the action state of the user is determined to be "rest" in any external environment of the input data table 121*b*. In a case where the motion state of the input data table 121*a* is "specific arm movement", the action state of the user is determined to be "fishing" for each external environment of the input data table 121*b*, namely "mountain", "lake", and "sea".

In the action pattern determination table 122*a* illustrated in FIG. 3A, a mark × represents an action pattern that cannot generally occur, and a mark *1 represents a motion from which a movement that is characteristic of the fishing is estimated. Such a movement includes, for example, swinging a rod to throw a lure and pulling the lure regularly.

According to the action pattern prediction table 122*b* illustrated in FIG. 3B, in a case where the action states of the user before and after the prediction are "running" and "trail running", the action state of the user is predicted to be "trail running" even if the motion state deviates to some extent as represented by a mark *2. In a case where the action states before and after the prediction are "running" and "fishing", as represented by a mark *3, the motion state "specific arm movement" used for the determination of "fishing" is excluded, and operation of the gyro of the environmental sensor 112 is completely removed. As a result, these action states are eliminated as unlikely states or assigned an extremely low priority, whereby estimation accuracy is increased or power consumption is suppressed.

Figure 4:
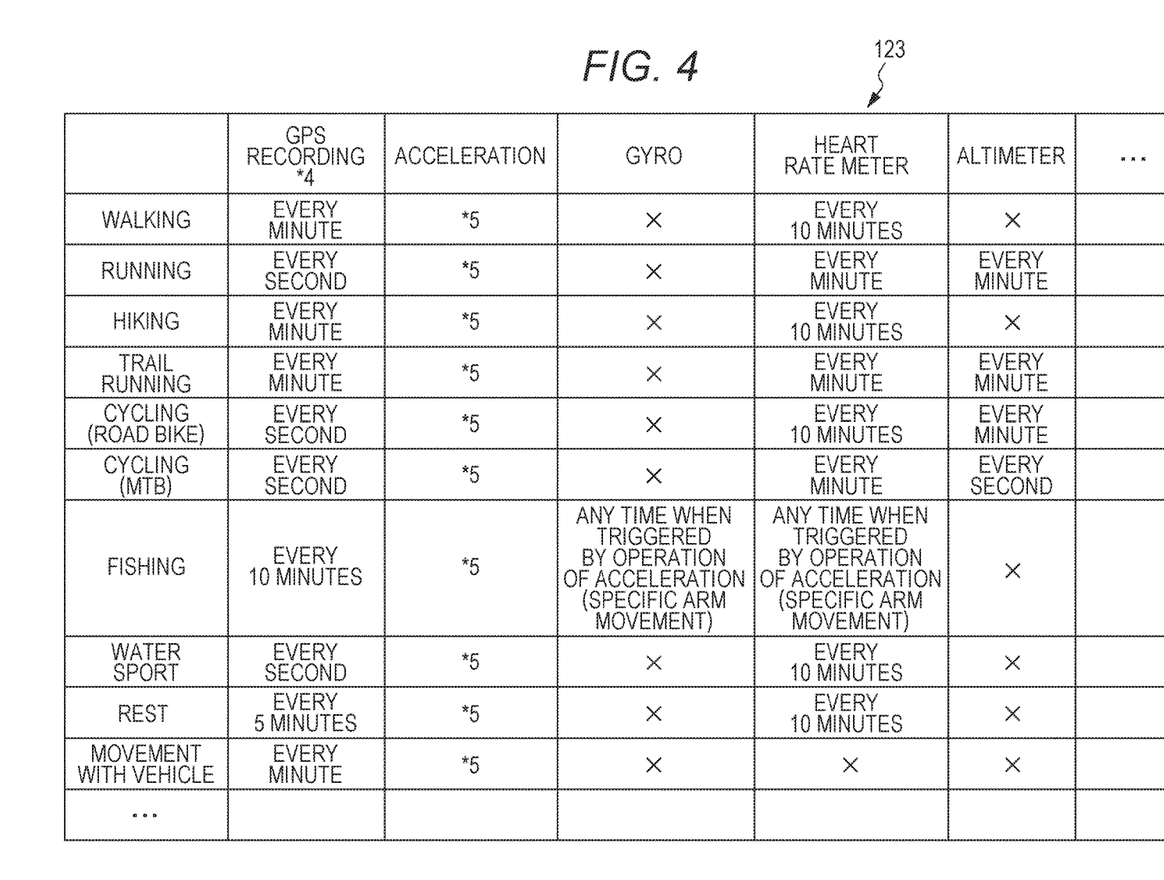
FIG. 4 is a diagram illustrating an exemplary data structure of a sensor control table of FIG. 1.

The sensor control table 123 illustrated in FIG. 4 has a data structure in which sensor control data for different types of sensors listed in a column direction are defined for the respective action states listed in a row direction. In other words, in a case where the determined or predicted action state of the user is "walking", the sensor control data are set in such a manner that GPS recording is performed at time intervals of "every minute", acceleration is measured "at all times", the "heart rate" is measured at "every 10 minutes", and the operation of the gyro and an altimeter is turned OFF. In a case where the action pattern is "running", the sensor control data are set in such a manner that the GPS recording is performed at time intervals of "every second", the acceleration is measured "at all times", the "heart rate" is measured at "every minute", and the operation of the gyro and the altimeter is turned OFF.

In a case where the action state of the user is "fishing", the sensor control data are set in such a manner that the GPS recording is performed at time intervals of "every 10 minutes", the acceleration is measured "at all times", the "heart rate" is measured at "every 10 minutes", the gyro and the heart rate are set at any time when triggered by the specific arm movement indicated by the acceleration, and the operation of the altimeter is turned OFF. In the sensor control table 123 illustrated in FIG. 4, a mark × represents that the sensor is turned OFF, and a mark *4 specifies an interval for recording the position information (interval desired by the user). In addition, GPS positioning for determining the external environment is performed regularly at optimal intervals in terms of the system. A mark *5 is basically set to "at all times" since currently, in many cases, the acceleration sensor is used for determining the motion state. When using another sensor, therefore, the mark *5 needs to be set for each motion type.

Operation of First Embodiment

Hereinafter, operation (sensor control method) of the portable electronic device 10 according to the first embodiment of the present invention illustrated in FIGS. 1 to 4 will be described in detail with reference to flowcharts of FIGS. 5 and 6. It is possible to realize each step described below by causing a computer to execute a corresponding program.

Figure 5:
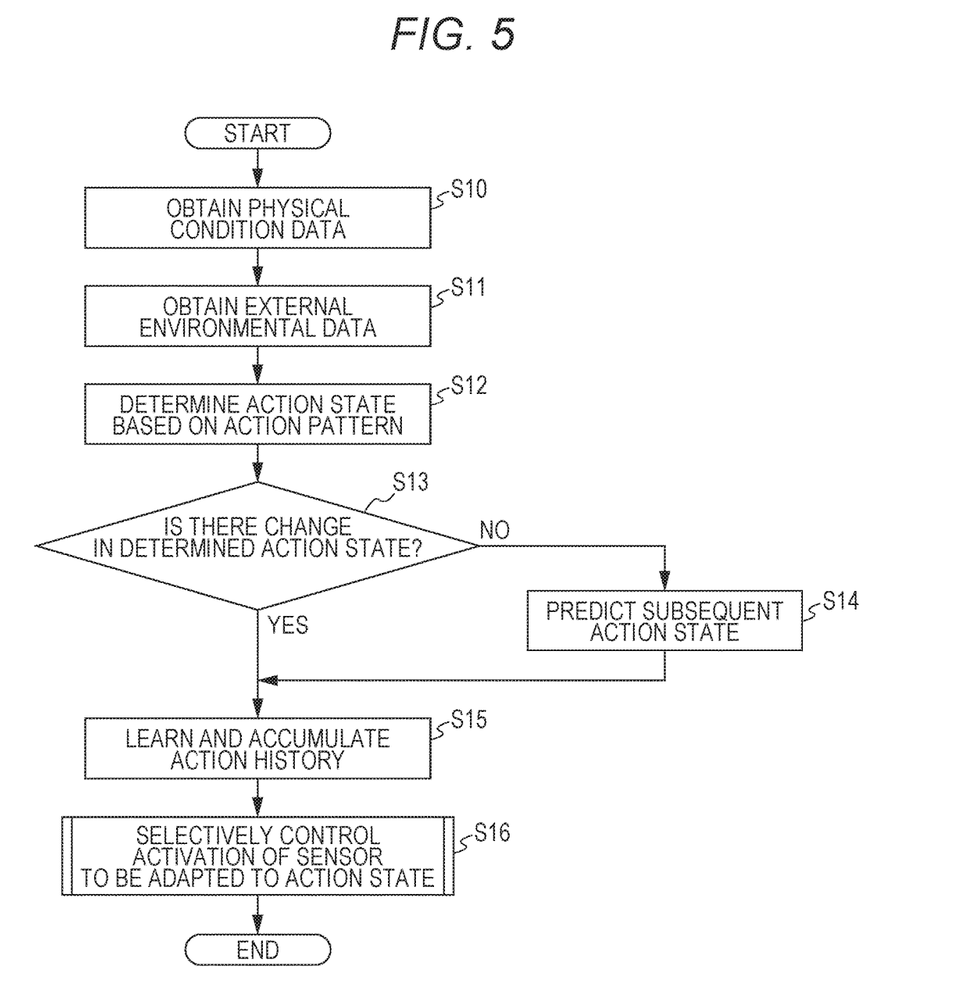
FIG. 5 is a flowchart illustrating basic operation of the portable electronic device according to the first embodiment of the present invention.

The flowchart of the basic operation of the portable electronic device 10 according to the first embodiment of the present invention is illustrated in FIG. 5. According to FIG. 5, in the portable electronic device 10 according to the first embodiment of the present invention, the biological sensor 111 of the sensor unit 11 detects physical condition data (biological information) of the user, which are then obtained by the control unit 13 and delivered to the operation state control unit 130 (step S10). Next, the environmental sensor 112 detects external environmental data (environmental information), which are then obtained by the control unit 13 and delivered to the operation state control unit 130 (step S11). At this time, the operation state control unit 130 also obtains other data such as GPS data detected by the environmental sensor 112. The biological information and the environmental information are measured and obtained in any order, and obtained according to order of being detected by the respective sensors.

In response to these steps, the operation state control unit 130 of the control unit 13 determines the action state of the user based on the action pattern stored in the action pattern storage unit 122 (step S12). Before determining the action state, the operation state control unit 130 generates, for example, data regarding the motion state and the external environment indicated in the input data tables 121*a*, 121*b* illustrated in FIGS. 2A and 2B based on the biological information and the environmental information obtained by the sensor unit 11. The operation state control unit 130 then searches, for example, the action pattern determination table 122*a*, the exemplary data structure of which is illustrated in FIG. 3A, based on the motion state and the external environment set in the input data tables. In a case where, for example, the motion state set in the input data table 121*a* is "walking", and the external environment set in the input data table 121*b* is "on road", the operation state control unit 130 determines that the action state of the user is "walking".

When a certain change is recognized in the motion state and/or the external environment set in either of the input data tables 121*a*, 121*b* (step S13 "YES"), the operation state control unit 130 activates the prediction unit 132 and causes the prediction unit 132 to execute a process of predicting the next action state subsequent to the action state currently in progress determined by the operation state control unit 130. The prediction unit 132 executes the prediction of the action state of the user by, for example, searching the action pattern prediction table 122*b* illustrated in FIG. 3B. In other words, in a case where both of the action patterns before and after the prediction are "running", the prediction unit 132 predicts that the subsequent action state of the user is "running" In a case where the action patterns before and after the prediction are "running" and "trail running", the prediction unit 132 predicts that the subsequent action state of the user is "trail running" (step S14).

Next, the operation state control unit 130 activates the learning unit 131 and causes the learning unit 131 to execute a process of learning the action state (step S15). The learning unit 131 performs control so as to cause the learning result to be reflected in the typical action pattern stored in the action pattern determination table 122*a*, and store such an action pattern as the action history of the user. In other words, the action history is sequentially updated in accordance with the action of the user, and the action state is predicted based on the learning with reference to the updated action history.

Finally, the operation state control unit 130 selectively controls activation of the sensor unit 11 to be adapted to the action state determined by the operation state control unit 130 itself or the subsequent action state predicted by the prediction unit 132 (step S16). The operation state control unit 130 executes the selective activation control for the sensor unit 11 by searching, for example, the sensor control table 123 illustrated in FIG. 4. For example, in a case where the action state determined by the operation state control unit 130 is "running", the operation state control unit 130 performs control in such a manner that the GPS recording is performed at time intervals of "every second", the acceleration is measured "at all times", the "heart rate" is measured at "every minute", and the operation of the gyro and the altimeter is turned OFF. In a case where the subsequent action state predicted by the prediction unit 132 is "trail running", the operation state control unit 130 performs control in such a manner that the GPS recording is performed at time intervals of "every minute", the acceleration is measured "at all times", the "heart rate" is measured at "every minute", the altimeter is set to "every minute", and the operation of the gyro is turned OFF.

Figure 6:
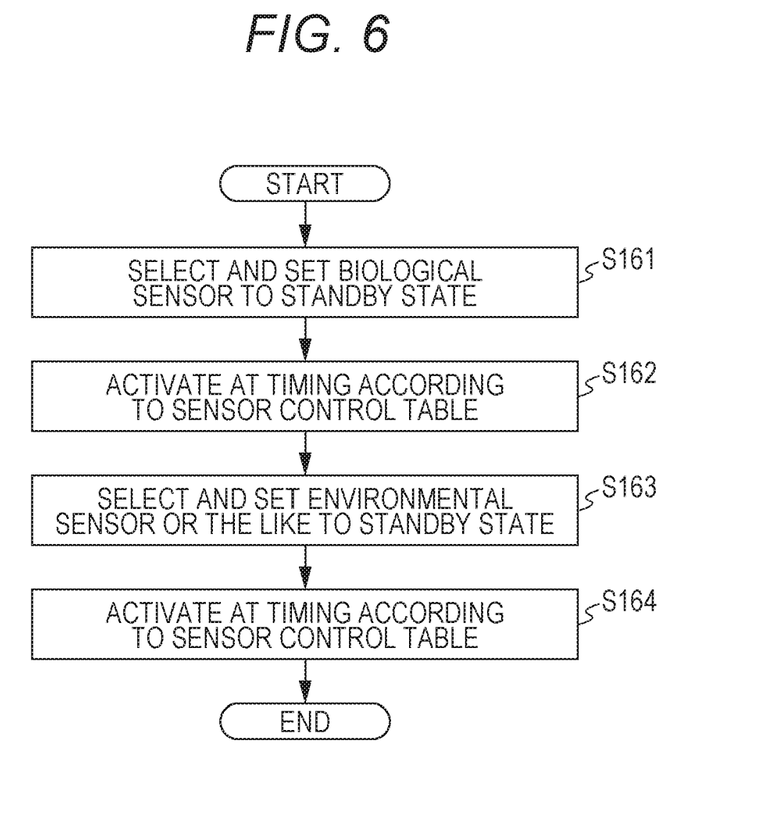
FIG. 6 is a flowchart illustrating in detail a part of the operation of FIG. 5.

A detailed procedure for "selectively controlling the activation of the sensor to be adapted to the action state" in step S16 of FIG. 5 is illustrated in FIG. 6. According to FIG. 6, the operation state control unit 130 operates in such a manner that the sensor selecting unit A 133 selects at least one of the biological sensors 111 and sets the selected biological sensor 111 to the standby state (step S161), and the sensor activating unit A 134 activates the same biological sensor 111 at a timing according to the sensor control table 123 (step S162). In other words, the operation is performed such that the "heart rate" is measured at "every minute" in a case where the action state determined by the operation state control unit 130 is "running", and the "heart rate" is measured at "every 10 minutes" in a case where the action state determined by the operation state control unit 130 is "walking".

Next, the operation state control unit 130 operates in such a manner that the sensor selecting unit B 135 selects at least one of the environmental sensors 112 and sets the selected environmental sensor 112 to the standby state (step S163), and the sensor activating unit B 136 activates the same environmental sensor 112 at a timing according to the sensor control table 123 (step S164). In other words, the operation is performed such that the GPS recording is performed at time intervals of "every second", the acceleration is measured "at all times", and the operation of the gyro and the altimeter is turned OFF in a case where the action state determined by the operation state control unit 130 is "running", and the GPS recording is performed at time intervals of "every minute", the acceleration is measured "at all times", the altimeter is set to "every minute", and the operation of the gyro is turned OFF in a case where the action state determined by the operation state control unit 130 is "trail running".

If the operation is not that desired by the user, the user can manually modify the sensor control table 123 to change the activation timing. For example, the sensor control data set by default in the sensor control table 123 are displayed on the display unit 14, and manual operation for the touch panel unit 15 that accompanies cursor movement enables, for example, the setting of the GPS measurement log set for "hiking" to be changed from the default 1 minute intervals to the 5 minute intervals, or the setting of the altitude measurement log to be changed to the 5 minute intervals.

Effect of First Embodiment

As mentioned above, in the portable electronic device 10 according to the first embodiment of the present invention, the control unit 13 controls, with reference to the action pattern storage unit 122 that stores therein the action pattern, the operation state of the sensor unit 11 (the biological sensor 111 and the environmental sensor 112 including the GPS receiver or the like) such that the operation state is adapted to the action state of the user. As a result, the activation of the sensor can be automatically controlled so that the operation timing, the type, and the interval for the sensor unit 11 are optimally selected. Therefore, the operation of the sensor can be optimally controlled without depending on various types of users or a variety of user actions.

It is also possible to save power while the user is not aware of it. With regard to the measurement of the heart rate, for example, while there is a demand for measuring and confirming the heart rate at all times during the high-load exercises such as the running and the bicycle, the exercises such as climbing a mountain performed at a steady pace do not require the measurement or only require the measurement at very long intervals (for the purpose of confirming the pace or checking initial symptoms of altitude sickness) in many cases. Operating the unnecessary sensor or operating the sensor more frequently than necessary without distinguishing between these types of exercises leads to rapid exhaustion of a battery for the portable electronic device 10. In the portable electronic device 10 according to the first embodiment of the present invention, however, the operation of the needless sensor can be stopped and the operation interval for the selected sensor can also be controlled. As a result, it is possible to save power while the user is not aware of it.

The user can also modify the sensor control data set in the sensor control table 123 according to his/her preferences. Once the modified sensor control data are learnt, the next and subsequent controlling processes for the sensor unit 11 can be controlled at a timing desired by the user. When the control unit 13 recognizes that the user is approaching an area which the user has once been to, the control unit 13 can refer to the accumulated action history of the user to control the sensor in the same way. In this case, since the control unit 13 (operation state control unit 130) only needs to refer to the action history of the user and the process of determining the action state is no longer required, entire throughput is improved. For example, in a case where there is a log obtained when the user previously went on a hike near Mount X, and the user is now moving on foot in Mount X again, the control unit 13 determines to perform the same measurement for the hiking, thereby capable of selecting and operating only the necessary sensor in the same way as the last time. In addition, for example, it is also possible to perform control so as to display, on the display unit 14, a dialog for temporarily stopping the sensor measurement and the log recording when the user is determined to have been in a stationary state for n minutes, and restart the operation, after the temporary stop, once the user starts walking.

The above-mentioned portable electronic device 10 according to the first embodiment of the present invention is a stand-alone configuration including the action pattern storage unit 122 placed within the device, and the control unit 13 controls, with reference to the action pattern storage unit 122, the operation state of the coupled sensor unit 11 such that the operation state is adapted to the action state of the user. However, the operation of the portable electronic device 10 is not limited to this operation.

The action pattern storage unit 122 within the portable electronic device 10 can function as a memory that receives the action pattern stored in an external server (not illustrated) via the communication unit 16 to temporarily preserve the received action pattern. Consequently, it is possible to refer to a large number of action patterns and action histories of a large number of users.

Furthermore, the portable electronic device 10 can make an inquiry to the server through the communication unit 16 via a network, and the server can automatically control the operation state of the sensor of the terminal such that the operation state is adapted to the action state of the user. In this case, since the terminal can obtain the optimized sensor control data only by sending, to the server, the biological information and the environmental information or the like detected by the sensor unit 11, the processing load on the terminal can be greatly reduced.

Hereinafter, a sensor control system using a network will be described as a second embodiment with reference to FIGS. 7 and 8.

Configuration of Second Embodiment

Figure 7:
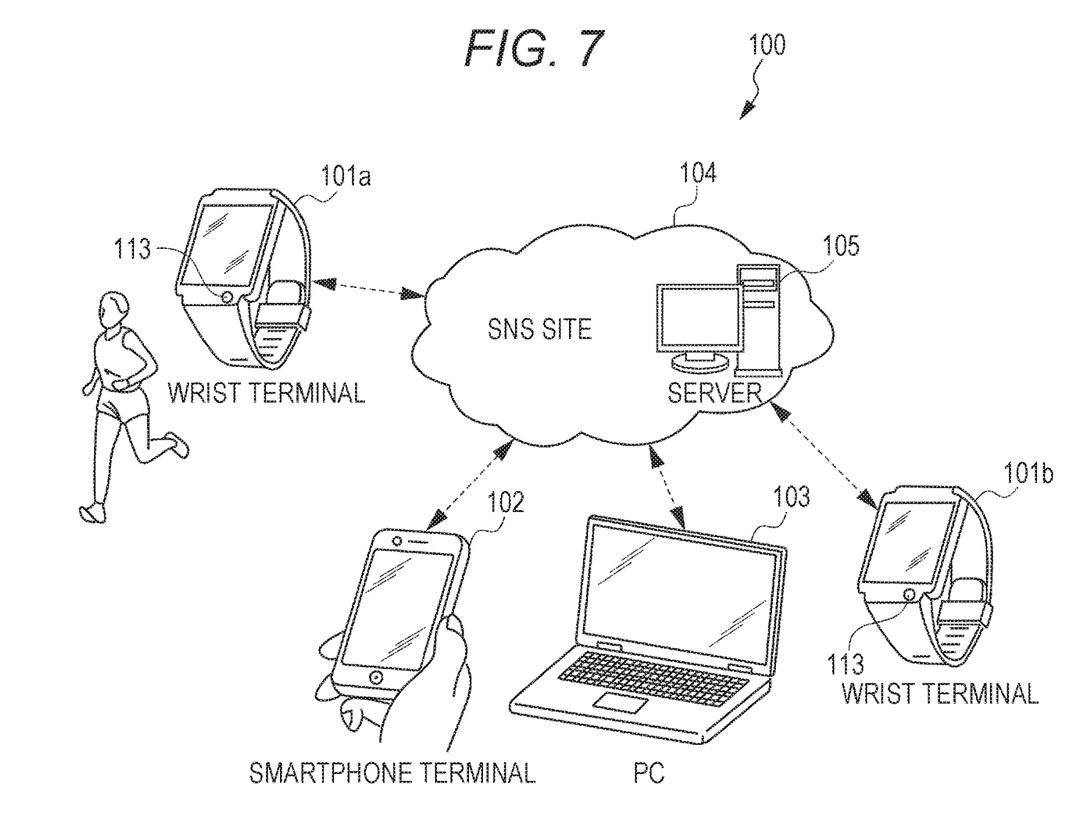
FIG. 7 is a diagram illustrating a configuration of a sensor control system according to a second embodiment of the present invention.
Figure 8:
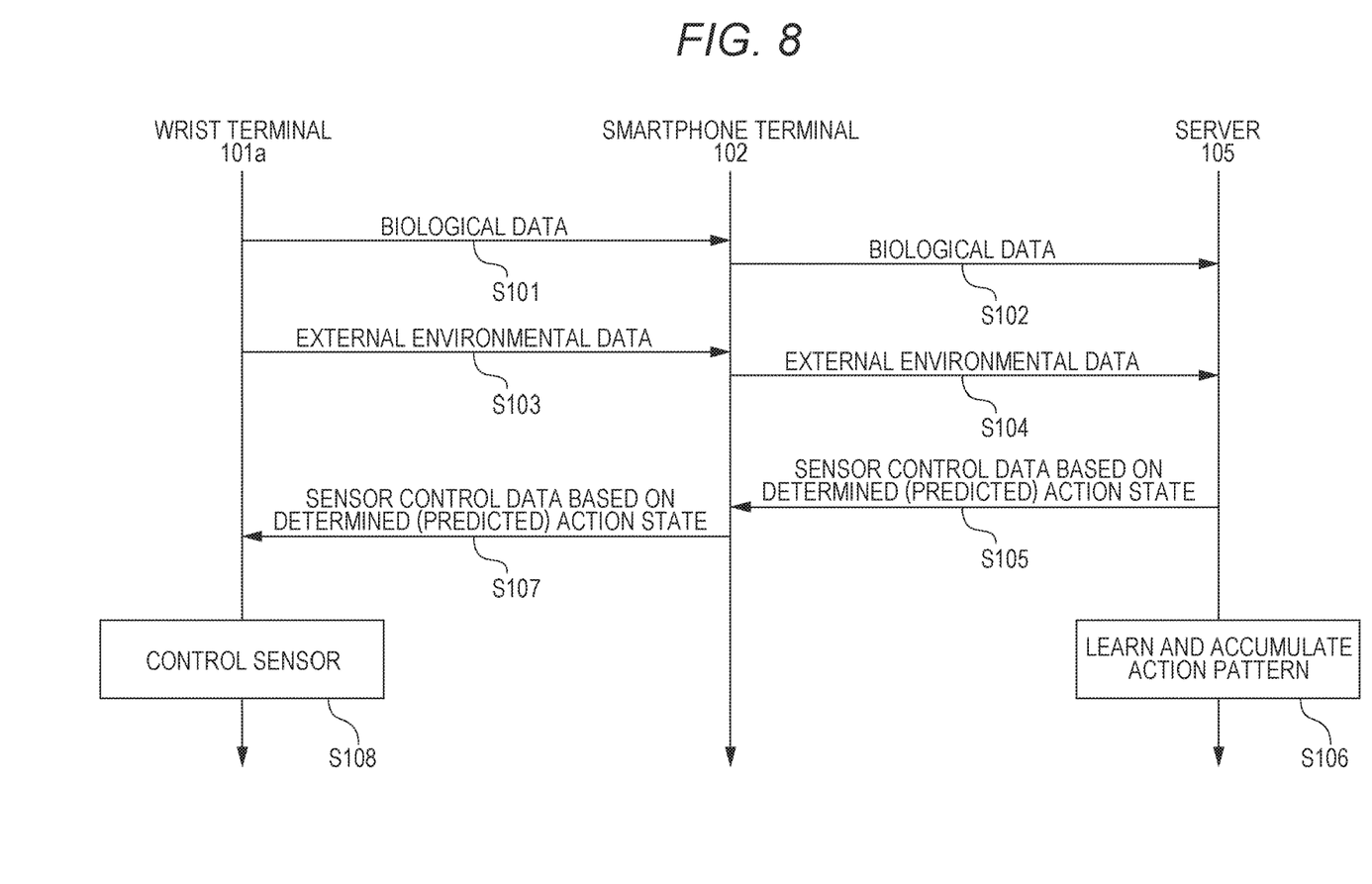
FIG. 8 is a diagram illustrating an operation sequence of the sensor control system according to the second embodiment of the present invention.

A configuration of the sensor control system 100 according to the second embodiment of the present invention is illustrated in FIG. 7. In the following description, a smartphone is referred to as smartphone terminal, a personal computer is abbreviated as PC, and a social network service system is abbreviated as SNS.

An SNS site 104 including a server 105 is coupled, via the Internet, to a smartphone terminal 102, wrist terminals 101*a*, 101*b*, and a PC 103, each owned by a member. The wrist terminals 101*a*, 101*b* as used herein each refer to a wristwatch terminal that can be worn on a human arm and wirelessly connected to the smartphone terminal 102. The wrist terminal 101*a* has a main body including the biological sensor and the environmental sensor including the GPS receiver or the like illustrated in FIG. 1 as the sensor unit 11. The main body also includes the control unit that controls these sensors. The main body is a wearable main body capable of being worn by the user. In the example illustrated in FIG. 7, the imaging sensor 113 such as the CMOS and the CCD is provided as a part of the sensor unit 11.

The smartphone terminal 102 functions as a communication terminal. An application program is installed on the smartphone terminal 102 so that the smartphone terminal 102 operates in cooperation with the SNS site 104. Relatively light application programs are installed on the wrist terminals 101*a*, 101*b* as well so that the wrist terminals 101*a*, 101*b* operate in cooperation with the smartphone terminal 102. In other words, the smartphone terminal 102 mediates between the wrist terminals 101*a*, 101*b* and the SNS site 104 and can be replaced with a small PC, a tablet, a wireless router or the like. Another route is also available in which the wrist terminals 101*a*, 101*b* are directly connected to the server 105 so that information can be exchanged using Wi-Fi (registered trademark) or a telephone line without passing through the smartphone terminal 102.

The server 105 includes the action pattern storage unit that stores therein the action pattern, the exemplary data structure of which is illustrated in FIGS. 3A and 3B. The server 105 sends, to the control unit of the portable electronic device such as the wrist terminals 101*a*, 101*b* and with reference to the action pattern storage unit, a control signal for controlling the operation states of the biological sensor, the environmental sensor, and the imaging sensor 113 coupled to the wrist terminals 101*a*, 101*b* such that the operation states are adapted to the action state of the user. The control unit then controls, based on the control signal, the operation state of the sensor unit such that the operation state is adapted to the action state of the user. The server 105 also includes the input data table, the exemplary data structure of which is illustrated in FIGS. 2A and 2B, and the sensor control table, the exemplary data structure of which is illustrated in FIG. 4.

Operation of Second Embodiment

Hereinafter, operation (sensor control method) of the sensor control system 100 according to the second embodiment of the present invention will be described in detail with reference to an operation sequence diagram of FIG. 8. It is possible to realize each step described below by causing a computer to execute a corresponding program. First, according to FIG. 8, the wrist terminal 101*a* sends the biological information detected by the biological sensor to the server 105 via the smartphone terminal 102 (step S101, S102). Next, the wrist terminal 101*a* sends the environmental information and other data detected by the environmental sensor including the GPS receiver to the server 105 via the smartphone terminal 102 (step S103, S104). The biological information and the environmental information are obtained by the server 105 in any order, and obtained according to order of being detected by the respective sensors.

The server 105 which has obtained the biological information and the environmental information or the like from the wrist terminal 101*a* searches the built-in action pattern storage unit, generates the sensor control data based on the determined or predicted action state of the user, and sends the sensor control data to the wrist terminals 101*a*, 101*b* via the smartphone terminal 102 (step S105, S107). The server 105 simultaneously learns the action state of the user and accumulates the result in a built-in memory to use the result for determining or predicting the next and subsequent action states of the user (step S106). The wrist terminals 101*a*, 101*b* which have received the sensor control data control the coupled biological sensor, environmental sensor, and imaging sensor 113 according to the sensor control data (step S108). In other words, the wrist terminals 101*a*, 101*b* stop the operation of the unnecessary sensor depending on the action state of the user, and activate and operate the selected sensor at an instructed timing.

Effect of Second Embodiment

As mentioned above, the sensor control system 100 according to the second embodiment of the present invention is configured in such a manner that the wrist terminals 101*a*, 101*b* make inquiries for the sensor control data to the server 105 based on the detected biological information and environmental information or the like, and the server 105 controls, with reference to the built-in action pattern storage unit, the operation states of the sensors of the wrist terminals 101*a*, 101*b* such that the operation states are adapted to the action state of the user. As a result, the wrist terminals 101*a*, 101*b* can be automatically controlled so that the operation timing, the type, and the interval for the sensor are optimally selected. Therefore, the operation of the sensor can be optimally controlled without depending on various types of users or a variety of user actions. At this time, since the operation of the needless sensor can be stopped and the operation interval for the selected sensor can also be controlled, unnecessary consumption of batteries for the wrist terminals 101*a*, 101*b* can be suppressed and failure or the like in the measurement due to an operating error of the user can also be avoided.

In the same way as the portable electronic device 10 according to the first embodiment, the sensor control system 100 according to the second embodiment also allows the user to modify the tables or the like built in the server 105 according to his/her preferences. Once the modified tables or the like are learnt, the next and subsequent controlling processes for the sensor can be controlled at a timing desired by the user. Since the determination is mainly performed by the server 105, the tables can be updated precisely and finely without the need for frequently rewriting firmware in the main bodies of the wrist terminals 101*a*, 101*b*.

The present invention has been described so far with reference to each embodiment. Needless to say, however, the technical scope of the present invention is not limited to the scope described in the above-mentioned embodiments. It is obvious to a person skilled in the art that various changes or modifications can be applied to the above-mentioned embodiments. It is also obvious from the description of the scope of the claims that such changed or modified embodiments can also be included in the technical scope of the present invention.

The invention described in the scope of the claims originally attached to the application form of the present application is appended below. Numbers of the claims described in the appendix are the same as those of the scope of the claims originally attached to the application form of the present application.

The invention claimed is:

1. A portable electronic device comprising:
a sensor unit including a biological sensor configured to measure a motion state of a user and an environmental sensor configured to measure an external environment;
an input data table to which the motion state of the user measured by the biological sensor is input;
an action pattern storage unit configured to store an action pattern of the user; and
a control unit configured to control an operation state of the sensor unit such that the operation state is adapted to an action state of the user,
wherein the input data table includes (i) a first input data table configured to store the motion state of the user, and (ii) a second input data table configured to store the external environment,
wherein the action pattern storage unit includes (i) an action pattern determination table in which the action pattern of the user is set according to the motion state stored in the first input data table and the external environment stored in the second input data table, and (ii) an action pattern prediction table used to predict a next action pattern of the user subsequent to a current action pattern of the user,
wherein the control unit controls the operation state of the sensor unit with reference to the action pattern determination table,
wherein the control unit predicts the next action pattern subsequent to the current action pattern of the user with reference to the action pattern prediction table, and controls the operation state of the sensor unit such that the operation state is adapted to the predicted next action pattern of the user, and
wherein in a case where a previous action pattern determined with reference to the action pattern determination table is the same as a subsequent action pattern determined with reference to the action pattern determination table, the action pattern prediction table excludes a change in the motion state measured by the biological sensor from determination.

2. The portable electronic device according to claim 1, wherein when referring to the action pattern determination table, the control unit determines the action pattern of the user set by a matrix of the motion state and the external environment set in the input data table.

3. The portable electronic device according to claim 1, further comprising a sensor control table configured to store control data for the sensor unit that is activated to be adapted to the action pattern of the user,
wherein the control unit controls an operation state of each of the sensors included in the sensor unit with reference to the sensor control table.

4. The portable electronic device according to claim 1, wherein the first input data table sets and stores the motion state of the user according to biological information obtained by the biological sensor, the motion state being one of a stationary state, a walking state, and a running state, and the biological information being a heart rate or a pulse of the user.

5. The portable electronic device according to claim 1, wherein the environmental sensor includes a GPS, and the second input data table sets and stores the external environment according to environmental information obtained by the environmental sensor, the external environment being set and stored as one of a road, a mountain, a lake, and a sea, and the environmental information including at least one of an altitude, a position, and an attribute on a map.

6. The portable electronic device according to claim 1, wherein the action pattern determination table sets action pattern determination data for determining the action pattern according to the motion state set in the first input data table and the external environment set in the second input data table, the action pattern being one of walking, hiking, and watersports.

7. A sensor control method executed by a computer of a portable electronic device, the method comprising:
measuring (i) a motion state of a user, based on an output of a biological sensor, and (ii) an external environment, based on an output of an environmental sensor, the biological sensor and the environmental sensor being included in a sensor unit;
storing the motion state of the user in an input data table;
storing an action pattern of the user in an action pattern storage unit; and
controlling an operation state of the sensor unit such that the operation state is adapted to an action state of the user,
wherein the input data table includes (i) a first input data table configured to store the motion state of the user, and (ii) a second input data table configured to store the external environment,
wherein the action pattern storage unit includes (i) an action pattern determination table in which the action pattern of the user is set according to the motion state stored in the first input data table and the external environment stored in the second input data table, and (ii) an action pattern prediction table used to predict a next action pattern of the user subsequent to a current action pattern of the user,
wherein the controlling controls the operation state of the sensor unit with reference to the action pattern determination table,
wherein the controlling predicts the next action pattern subsequent to the current action pattern of the user with reference to the action pattern prediction table, and controls the operation state of the sensor unit such that the operation state is adapted to the predicted next action pattern of the user, and
wherein in a case where a previous action pattern determined with reference to the action pattern determination table is the same as a subsequent action pattern determined with reference to the action pattern determination table, the action pattern prediction table excludes a change in the motion state measured by the biological sensor from determination.

8. A non-transitory computer-readable recording medium having a program stored thereon, the program being executable by a computer of a portable electronic device to control the computer to perform functions comprising:
measuring (i) a motion state of a user, based on an output of a biological sensor, and (ii) an external environment, based on an output of an environmental sensor, the biological sensor and the environmental sensor being included in a sensor unit;
storing the motion state of the user in an input data table;
storing an action pattern of the user in an action pattern storage unit; and
controlling an operation state of the sensor unit such that the operation state is adapted to an action state of the user, wherein the input data table includes (i) a first input data table configured to store the motion state of the user, and (i) a second input data table configured to store the external environment, wherein the action pattern storage unit includes (i) an action pattern determination table in which the action pattern of the user is set according to the motion state stored in the first input data table and the external environment stored in the second input data table, and (ii) an action pattern prediction table used to predict a next action pattern of the user subsequent to a current action pattern of the user, wherein the controlling controls the operation state of the sensor unit with reference to the action pattern determination table, wherein the controlling predicts the next action pattern subsequent to the current action pattern of the user with reference to the action pattern prediction table, and controls the operation state of the sensor unit such that the operation state is adapted to the predicted next action pattern of the user, and wherein in a case where a previous action pattern determined with reference to the action pattern determination table is the same as a subsequent action pattern determined with reference to the action pattern determination table, the action pattern prediction table excludes a change in the motion state measured by the biological sensor from determination.

* * * * *

UNITED STATES PATENT AND TRADEMARK OFFICE
CERTIFICATE OF CORRECTION

PATENT NO.        : 10,203,672 B2
APPLICATION NO.   : 15/077714
DATED             : February 12, 2019
INVENTOR(S)       : Kayo Okada It is certified that error appears in the above-identified patent and that said Letters Patent is hereby corrected as shown below:

In the Claims

Column 15, Line 3 (Claim 8, Line 18), delete "(i)" and insert -- (ii) --.

Signed and Sealed this
Twenty-eighth Day of May, 2019

Andrei Iancu
*Director of the United States Patent and Trademark Office*